June 2, 1964 W. M. WRIGHT 3,135,838
ELECTROSTATIC LOUDSPEAKER
Filed Dec. 10, 1958 6 Sheets-Sheet 3

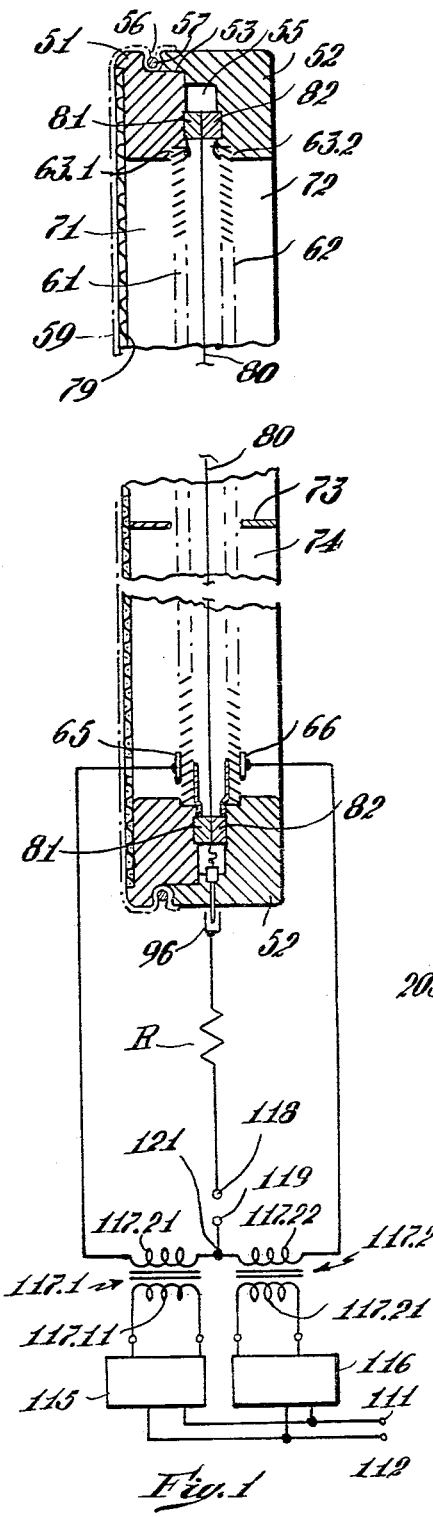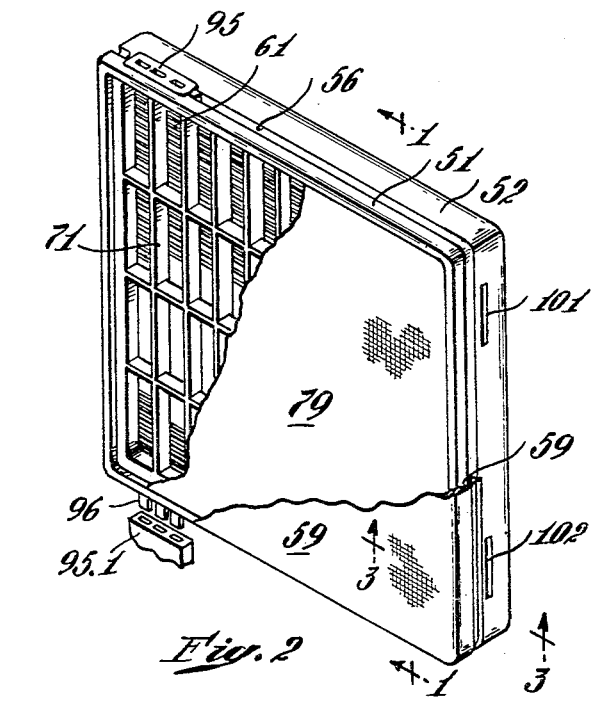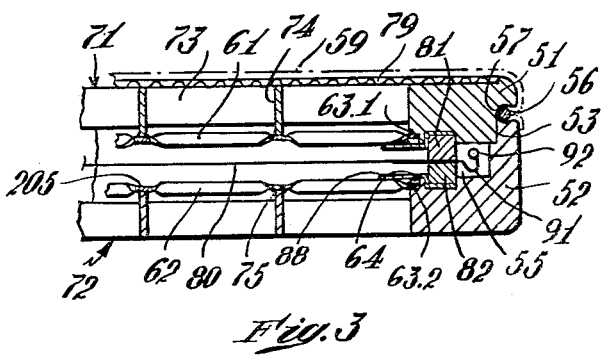

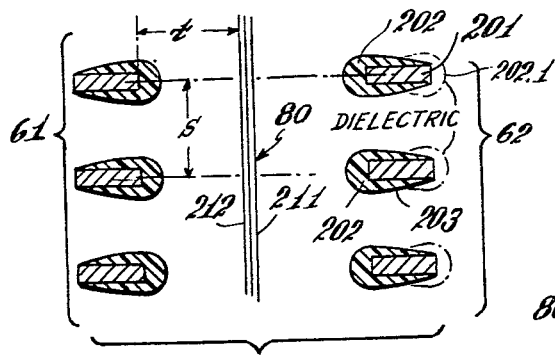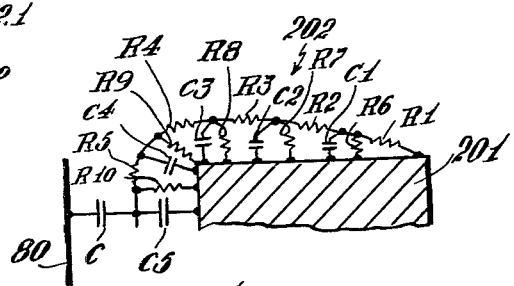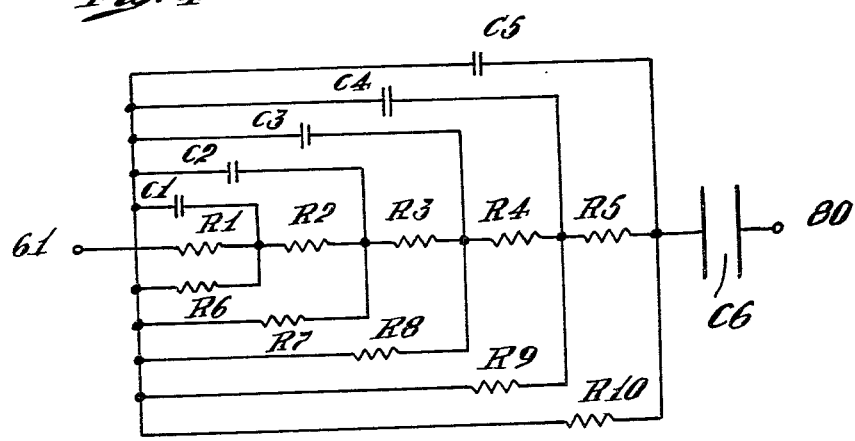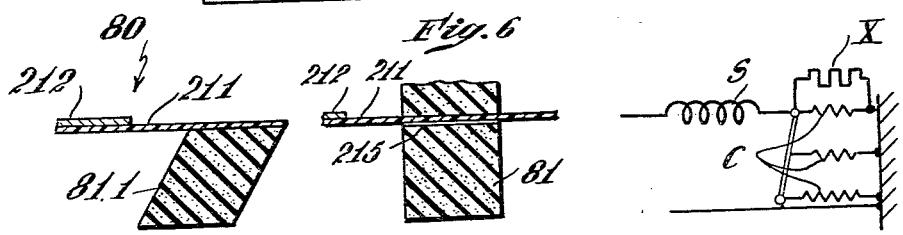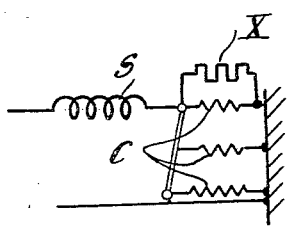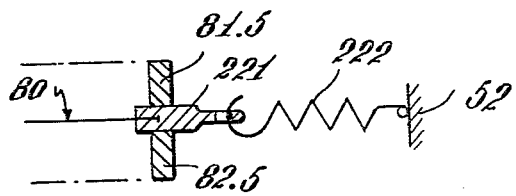

Inventor
William M. Wright
by Roberts, Cushman + Grover,
Attys.

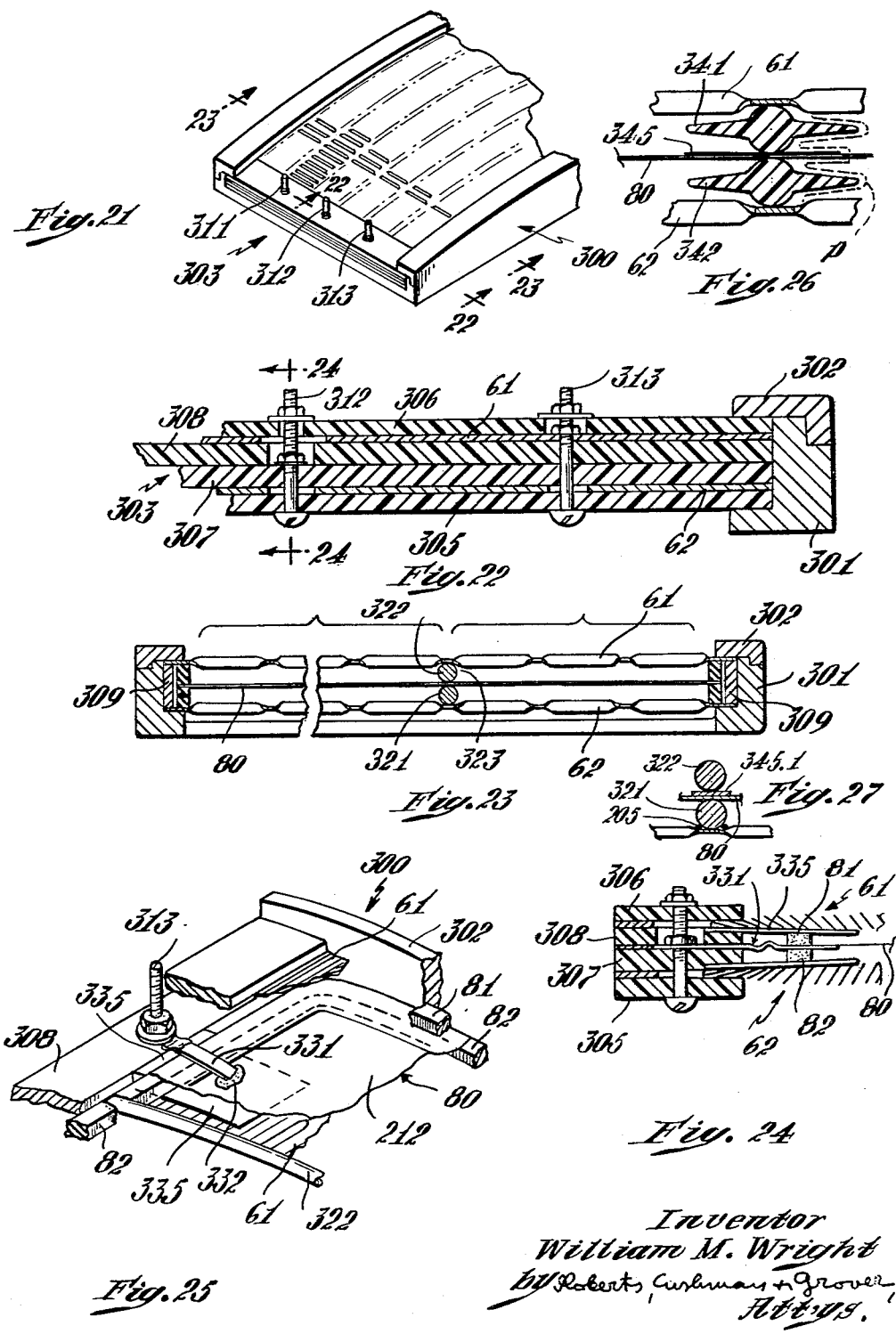

June 2, 1964 W. M. WRIGHT 3,135,838
ELECTROSTATIC LOUDSPEAKER
Filed Dec. 10, 1958 6 Sheets-Sheet 5
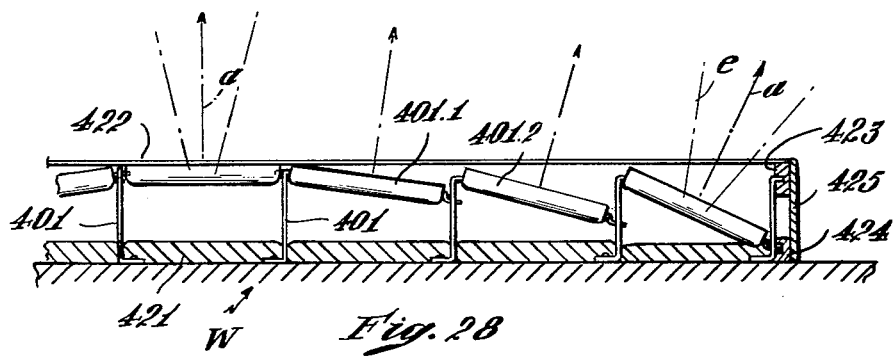
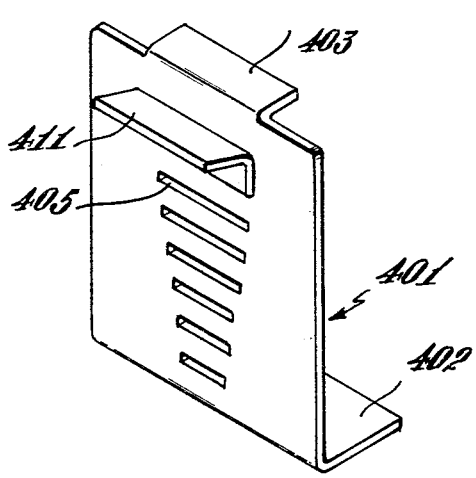
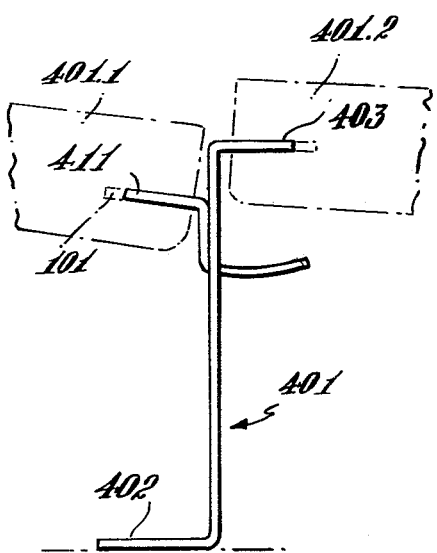
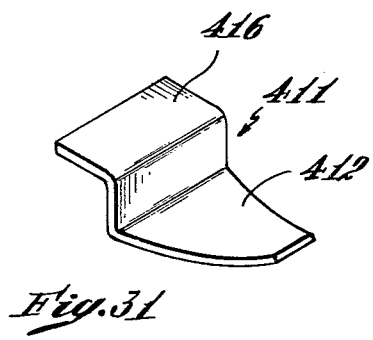
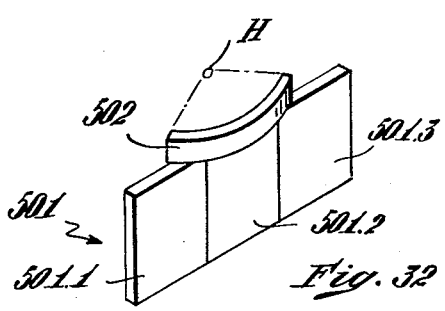
Inventor
William M. Wright
by Roberts, Cushman & Grover
Attys.

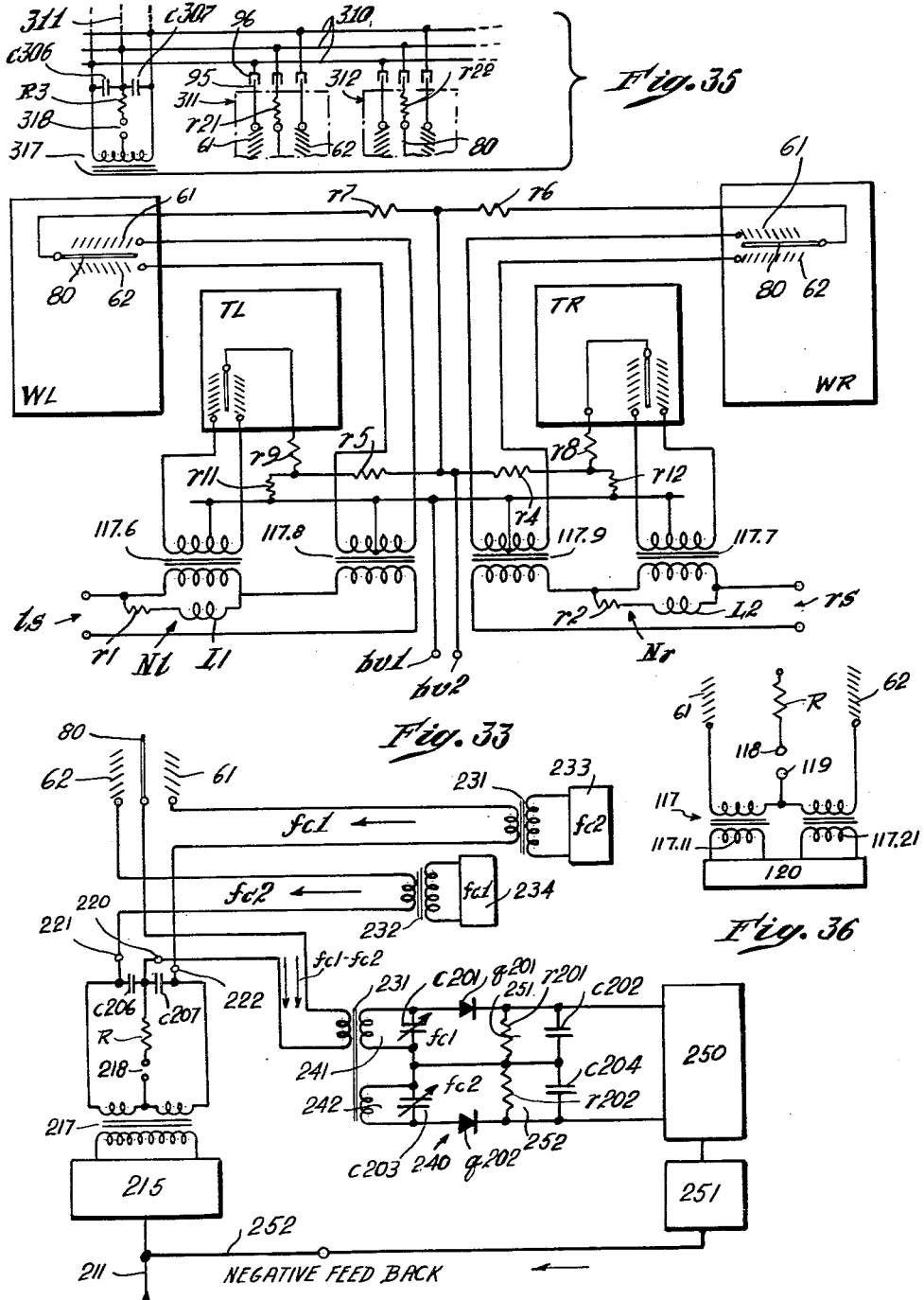

United States Patent Office 3,135,838
Patented June 2, 1964

3,135,838
ELECTROSTATIC LOUDSPEAKER
William M. Wright, Boston, Mass. (% Wright St. George Laboratories, Inc., 72 Elmwood St., Newton 58, Mass.)
Filed Dec. 10, 1958, Ser. No. 779,391
25 Claims. (Cl. 179—111)

The field of the present invention is that of electroacoustic transducers, and more particularly that of electrostatic loudspeakers.

It is well known that electrostatic transducers offer many inherent advantages such as excellent mechanical impedance match between the driving force and the air load, freedom from distortion, simplicity of design among others, which however cannot be fully utilized for practical purposes at least so far as loudspeakers as distinct from microphones are concerned, if they are to be used in the lower acoustic frequency range and for fairly large energy outputs. One of the main problems is a theoretically proper but also practically feasible correlation of the mechanical and electrical parameters of the stationary and moving electrodes. While certain improvements in this respect have been accomplished, the structures proposed for that purpose have so far not produced speakers which take full advantage of the above mentioned inherent advantages.

Objects of the present invention are to provide a stationary electrode for electrostatic loudspeaker systems which has optimal acoustic transparency and optimal rigidity, maintains a relatively even field, and also has insulation properties which permit operation at optimal voltages in such a manner that permanently damaging breakdowns are avoided or rendered harmless; to provide a stationary electrode whose elements are subject to little movement below the resonant frequency which is high enough to prevent fall-in at the bias voltages used; to provide a movable diaphragm electrode which prevents high stress concentration and insures high resonant frequency; to provide a diaphragm which maintains a fairly high ratio between live and dead areas with a fairly broad resonance of a reasonably low Q; to provide a diaphragm which is inherently protected against unfavorable sparking and which reduces parasitic leakages from the bias voltage supply point or diaphragm coating to the fixed electrode structure; to provide a diaphragm which permits the use of a coating of comparatively high resistance such that there is no change in charge density over the surface of the diaphragm which again permits the use of a large feed resistance assuring constant charge operation at even the lowest frequencies; and to provide simple and yet fully adequate provisions for electrically connecting the stationary and moving electrodes.

Other objects are to provide an electrostatic loudspeaker structure which does not require electrostatic charges that have to be moved without resulting in an acoustically useful energy output; to provide a loudspeaker structure of the above type which requires a minimum of supporting structure while providing sufficient rigidity; to provide such a system which can easily be adapted for large area units with low frequency radiation and for small area units with high frequency radiation which units can be easily combined and mounted, and which system can be easily arranged for stereophonic reproduction, with the units proportioned and arranged for optimum performance in such multiple systems; and to provide such a system which is capable of providing large output energies by means of comparatively large excursions of the diaphragm thus rendering unnecessary large diaphragm areas which have various disadvantages such as high directional effects at high frequencies.

Still further objects are to provide such a system which has high power handling capacity, which presents at all frequencies a planar source with little phase interference and which improves transient response; and to provide a speaker system which permits the building up of larger units from small components thus permitting the gradual enlargement and improvements of loudspeaker installations.

Additional objects are to provide an electrostatic speaker which permits the use of high bias voltages, of staggering of diaphragm resonances and of the use of advantageous feed-back operation; to provide a diaphragm suspension which is particularly efficient and durable; to provide assemblies and mounting means for electrostatic speakers of this type which are acoustically efficient, mechanically simple and very versatile and adaptable with respect to installation and acoustical matching with the given environment; and generally to provide improved electrostatic speakers which conform to the highest acoustical standards and are yet simple and rugged, and which are comparatively inexpensive while fully reliable as to stability of performance and duration.

A brief summary indicating the nature and substance of the invention for obtaining the above objects is as follows.

In one of its principal aspects the present invention comprises within an electrostatic transducer system an electrode screen composed of a plurality of similarly shaped elongate, strip shaped conductor elements which are joined parallel to each other in a regular pattern by supporting and conductively connecting bridges such that the longer transverse axis of each conductor element is inclined at a steep angle to the diaphragm of the transducer. In a preferred embodiment the fixed electrode screen is composed of strips and bridges integrally stamped from a piece of sheet metal with the strips bent from the sheet metal plate parallel to each other while the conductively and mechanically connecting transverse bridging areas remain in the plane of the original sheet. Commercially available window screens of the light reflecting or shielding type can be easily adopted for the present purpose, either in commercially available dimension and configurations or with dimensions and configurations to which existing metal stamping machinery can be easily adapted.

In another important aspect of the invention an essentially stiff stationary electrode for electrostatic cooperation with an adjacent moving diaphragm of an electrostatic loudspeaker comprises metallic strip elements arranged side by side adjacent to the diaphragm and, applied to these lattice elements an insulating sheath or shield which is unsymmetrical to the cross section of each strip element such that the dielectric strength of this insulating element diminishes with increasing distance from the diaphragm of respective points of the metallic element to which the insulating shield is applied, whereby breakdown between fixed electrode and swinging diaphragm can be confined to portions of the strip elements which are on the side opposite to the diaphragm. In a preferred practical embodiment the strip elements have an elongate, usually rectangular cross section with the longer dimension of this cross section steeply inclined to the diaphragm plane; the insulating shield can then be applied by dipping or spraying such that it is thickest at the edge of each strip which is next to the diaphragm whereas the opposite edges of the strips are uncoated or only very thinly coated. The same principle can be carried out by using lattice elements which do not have a flat such as rectangular cross section or are even round or square, so long as the dielectric material is applied in the above indicated fashion, namely dielectrically appreciably stronger near the diaphragm.

In a further important aspect of the invention the electrode diaphragm of an electrostatic transducer comprises a compliance sheet of insulating material and applied to this sheet means for establishing on the sheet an electrostatic charge having a resistance sufficiently high to maintain a constant charge per unit area of the sheet for any displacement configuration thereof. In an especially practical embodiment the resistive coating of the diaphragm is essentially restricted to a free portion of the sheet, stopping short of the marginal portion which is fastened to a frame. For purposes of providing a feed terminal the diaphragm sheet has in a particularly useful practical embodiment an extension of restricted width of the conductive coating reaching towards the frame means to which the diaphragm is fastened.

Further aspects and advantages of the invention will appear from the following detailed description of several practical embodiments including preferred structures for mounting loudspeakers according to the invention and electric circuits for operating them, together with an outline of its principles, its mode of operation and its practical possibilities.

The description refers to drawings in which:

FIG. 1 is a schematic cross section of a speaker system according to the invention, transverse to the strips of the fixed electrodes and including a simplified circuit diagram of the signal supply;

FIG. 2 is an axonometric view of the speaker unit proper as shown in FIG. 1, with the speaker cloth partly broken away;

FIG. 3 is a cross section on line 3—3 of FIG. 2;

FIG. 4 is an enlarged transverse cross section through the diaphragm and the fixed electrodes on either side;

FIG. 5 is an equivalent electric diagram of one half of an electrode strip illustrating the functioning of these insulated electrodes;

FIG. 6 is a diagram similar to FIG. 5 but with the impedances shown in conventional manner and for one entire strip element in correlation with the diaphragm;

FIGS. 7 and 8 are schematical transverse sections through the diaphragm suspension, in unstretched or initial, and stretched or operative condition, respectively;

FIG. 9 is an equivalent mechanical impedance diagram of the arrangement according to FIGS. 7 and 8;

FIG. 10 is a schematical representation of a modification of the diaphragm suspension according to FIGS. 7, 8 and 9;

FIG. 21 is an axonometric view of the front end of a curved speaker according to the invention;

FIG. 22 is a section on lines 22—22 of FIG. 21;

FIG. 23 is a section on lines 23—23 of FIG. 21;

FIG. 24 is a section on lines 24—24 of FIG. 22;

FIG. 25 is an axonometric view, with parts broken away, showing the terminal connection leading to the diaphragm of a speaker according to FIGS. 21 to 24;

FIGS. 26 and 27 are sections, similar to FIG. 25, illustrating modified separating rods and insulations according to the invention;

FIG. 28 is a transverse section through an assembly of a plurality of speaker units according to the invention showing the bracket structure, likewise according to the invention, for mounting speaker units at given inclination to a mounting surface;

FIG. 29 is an axonometric view of a bracket and speaker unit clamp such as indicated in FIG. 27;

FIG. 30 is a side elevation of the bracket and clamp according to FIG. 28;

FIG. 31 is an axonometric view of the speaker clamp shown in FIGS. 29 and 30;

FIG. 32 is an axonometric view of a speaker arrangement according to the invention;

FIG. 33 is a block circuit diagram of a stereophonic installation incorporating speakers according to the invention;

FIG. 34 is a circuit diagram showing a feed-back arrangement according to the invention;

FIG. 35 is a circuit diagram showing a biasing arrangement which is particularly suited for speaker installations according to the present invention; and FIG. 36 is a circuit diagram showing an alternative to FIG. 33, of coupling the primary amplifier with the speaker system proper.

Basic Construction

Figure 11:
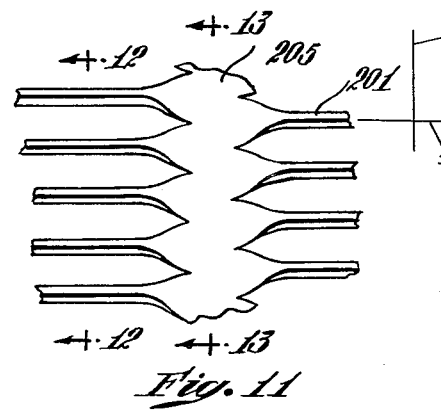
FIG. 11 is the front elevation of a segment of a strip work fixed electrode such as used within the present invention.

FIGS. 1 to 3 illustrate the basic construction of speaker system according to the invention. The unit shown can be used by itself or connected to other units in any suitable manner, and it can be variously dimensioned according to requirements, especially of audio frequency to be emitted. FIGS. 1 to 3 also illustrate one practical embodiment of mounting electrodes, according to the invention.

In FIGS. 1 to 3, numerals 51 and 52 indicate mounting frames of suitable, such as wood or plastic, material fitting and being distanced by means of a recess 53 of frames 52. The two frame parts can be cemented at this joint or otherwise fastened together. In a preferred embodiment the two frame portions form a groove 56 which confines by means of a rectangular piece of retaining tubing 57 a grill cloth indicated at 59.

Fastened to the respective frame portions 51 and 52 are two strip and bridge screen portions 61, 62 respectively, which will be described in detail hereinbelow. These electrode screens fit peripheral recesses 63.1, 63.2 (FIG. 3) into which they are suitably fastened, for example by means of cement 64. The electrical connections of the two screen electrodes, indicated schematically at 65 and 66 of FIG. 1 will likewise be described hereinbelow.

Figure 20:
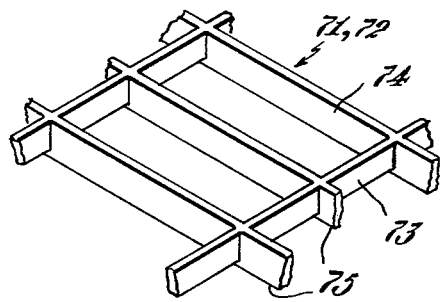
FIG. 20 is an axonometric view of an insulating grill structure used according to one embodiment of the invention to confine the electrode screens.

The screen electrodes of the present embodiment are preferably secured by means of two grills 71, 72 made of suitable plastic material, shown more in detail in FIG. 20. These grills have transverse longitudinal portions 73 and 74, which latter protrude beyond the portions 73 as indicated at 75, such that the shorter portions 73 clear the electrode screens 61 and 62 respectively, whereas the portions 74 contact the connecting bridges 205 (FIG. 11) of the screens. These grills are suitably joined to the respective frames 51 and 52, for instance by cementing. Between the speaker cloth 59 and the outside grill such as 71 is preferably inserted a mat for example made of thin hard Fiberglas. It will be evident that the cloth 59 is first stretched over the frame portion 51 and then fastened by inserting the retaining tubing 57 into the jam slot 56.

The movable diaphragm is indicated at 80 and will be described in detail hereinbelow. It can be compliantly fastened to the frame pieces 51 and 52 by means of elastic pads 81, 82, which run peripherally on the inside of the framework (FIG. 3) and whose construction assembly and operation will be explained hereinbelow.

FIG. 3 indicates a signal supply lead 91 for the diaphragm which is conductively connected to a wire 92 concealed within the channel 55 of the framework. This wire and wires for the electrical connection of the rigid electrode screens 61 and 62 are conducted to the connectors 95, 96. Connector 95 has three jacks, and 96 has three pins; numeral 95.1 indicates another jack connector, either of the signal input or of the next frame if several units are coupled, whereas the jack 95 makes connection, if desired, to a triple pin unit for an input or frame on the other side.

At 101 and 102 of FIG. 2 are indicated slots for mounting brackets or clips which may optionally be used and will be described hereinbelow. Similar slots are provided on the opposite side of the frame. Sealing gaskets or pads can be applied to the sides of the framework in order compliantly to join adjacent units or units and supporting structure.

The electrical component of the speaker system as a whole is only schematically indicated in FIG. 1 and will be described in greater detail hereinbelow so far as it is especially adapted for the present speaker system.

In FIG. 1, numerals 111 and 112 indicate the signal input terminals which supply two amplifiers 115 and 116 which feed into the primaries 117.11 and 117.21 of transformers 117.1, 117.2 with secondaries 117.12 and 117.22. The bias voltage is applied at terminals 118 and 119 which lead to the midpoint 121 between the transformers 117.1 and 117.2 respectively. Resistor R leads through the connector 96 to the diaphragm 80. The outer terminals of the transformer secondaries 117.21 and 117.22 lead to the terminals 65 and 66 of the rigid screen electrodes 61 and 62.

It will be evident that a single fixed electrode of the general type hereindescribed could be used if this should be desirable for some purpose.

*The Fixed Screen Electrodes*

The acoustically and electrically effective elements of the preferred form of fixed screen electrodes according to the invention are illustrated in FIGS. 4 to 6. In these figures 201 indicates the strips of such electrodes, made of suitable metal such as bronze in the case of the commercially available screen material mentioned above, whereas 202 indicates the insulating shield applied thereto. Polyvinyl chloride thinly coated with a carbon black dispersion was found to be well suited for purposes of these shields. The carbon coatings are indicated at 203. Numeral 80 indicates the diaphragm between the two rigid electrodes 61 and 62. The construction of this diaphragm will be described more in detail hereinbelow.

The rigid electrodes, in the present case the strip screens 61 and 62 are in this embodiment formed of conductive material such that the minor axis of each screen strip lies in a plane perpendicular to or at a steep angle to the plane of the diaphragm, providing an acoustically transparent and yet very stiff structure of minimum weight. This minor axis of each strip, hereinabove also referred to as longer transverse axis, is indicated at z of FIGS. 11 and 12 where x is the longitudinal axis, and y the shorter transverse axis of the strip. The screens are further stiffened by means of gratings 71, 72 as above described with reference to FIGS. 1 to 3, or by tensioning the entire structure by curving it as will be described hereinbelow in the context of an alternative embodiment of the invention.

The screen strips 201 are provided, in accordance with the invention, with insulating shields 202 which are thickest at the sides nearest to the diaphragm, and which have a low surface resistance but high dielectric strength and moderate volume resistance. The above mentioned construction, with shields 202 and coatings 203, provides these characteristics.

Reduction of the surface conductivity by means of the thin coating 203 of a lamp-black dispersion was found to be beneficial although in most cases the surface moisture is sufficient for the purpose. FIG. 5 indicates the lumped impedances as they are actually distributed within and on the surface of the insulation shield 202, 203 whereas FIG. 6 indicates the same impedances in orderly presentation. By means of this construction, the following relationship of the electric values indicated in the equivalent circuit diagrams FIGS. 5 and 6 can be maintained.

$$1/R_n + 1/R_{n+1} + 1/R_{n+2} + \cdots > R_m + R_{m+1} + R_{m+2} + \cdots$$

and $$C_m + C_{m+1} + C_{m+2} + \cdots \ggg C_{n_1}$$

with $$\sum_{C_{m+p}}^{C_m} C$$

being insufficient to store potential effective to feed a spark between the electrode means. In these formulas, $R_n$ are surface resistances, $R_m$ are volume resistances, $C_m$ are capacitances of the coating material, and $p$ goes to infinity as the incremental volume goes to zero.

In this manner a large potential can be maintained between screen electrode and diaphragm, as indicated in FIGS. 5 and 6 which give specific lumped values C1 to C5 for $C_n$, lumped resistance values R1 to R5 for $R_n$, and lumped resistance values R6 to R10 for $R_m$.

The shields of the screen strips or slats also provide viscous dampening and thereby eliminate any tendency for the screens to vibrate parallel to their minor axes.

As indicated in FIG. 4, an additional dielectric shield 202.1 can be applied to the reverse side of the slats or rods 201, preferably of only one screen, here for example 62. This modification is based on the recognition that the strengthening of one screen will prevent breakdown between the two screens as might be caused by the application of a voltage much higher than the normal operating signal voltage, such as due to a faulty amplifier, open amplifier input, or amplifier instability causing high energy oscillation. This construction will in such instances allow breakdown between the diaphragm and the uncoated reverse area of the other screen—here for example 61—which is harmless even if the diaphragm should become punctured, as compared to the deterioration of the screen insulation by a breakdown path between the two screens. Thus, while either construction—with symmetrical or unsymmetrical screen sheathing relatively to the diaphragm—might cause diaphragm puncture, the unsymmetrical sheathing avoids with safety the creation of breakdown paths in that sheathing.

Figure 15:
FIGS. 15 and 16 are cross sections through insulated electrode strips according to the invention, illustrating the possibilities of applying the principle of unsymmetrical shields such as illustrated in FIGS. 4 to 6.

The sheathing portion 202.1 is preferably made of a straight high resistance, high breakdown dielectric such as Teflon, but it can be of the same material as the coating 202 in which case a structure similar to that shown in FIG. 15 results.

Figure 14:
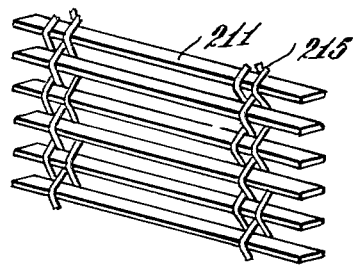
FIG. 14 is an axonometric view of another embodiment of a strip work fixed electrode such as can also be used for purposes of the invention.

In accordance with another practically quite important aspect of the invention, the spacing between the slats or strips of the screen electrodes is considerably smaller than that between each screen and the diaphragm, respectively. This provides an even potential gradient even at the ionization potential and even at the back or reverse side of the screens. These dimensions are indicated in FIG. 4 at "t" and "s." It will be understood that this figure is not to scale and that $t > s$. While the combination sheath configuration according to FIGS. 4, 14 and 15 is especially beneficial, it was found that the $d > s$ spacing permits satisfactory operation without acoustical deterioration due to clipping with a screen sheath of uniform thickness, or even with no coating at all. The last mentioned modification is quite satisfactory if the "t" dimension is 60 to 100 times the distance between rigid screen electrode and compliant diaphragm that would normally be dictated by the diaphragm alone. In other words, instead of basing the "t" distance on the maximum diaphragm excursion plus a safety value dependent on manufacturing tolerances or shop practices, in accordance with the present invention it is possible to start out with a very generous $t>s$ ratio which practically permits manufacturing problems and diaphragm excursions to be disregarded; this also makes unnecessary delicate and complicated provisions for compensating extraneous factors such as temperature and moisture, beyond the simple and rugged diaphragm suspension according to FIGS. 7 to 10.

It was found that the $t>s$ spacing (FIG. 4) of uncoated, bare rods or slats (such as 201.2 of FIG. 16 or 201.1 of FIG. 15, respectively) permits a safe reaching of the maximal operation point of the use, which point might lie within 5% of the predictable ionization or "clipping" point of operation, the prediction being base on an idealized case having no deviation whatsoever in the spacing, and being based on a pair of infinite parallel, solid electrodes.

The Diaphragm

Figure 17:
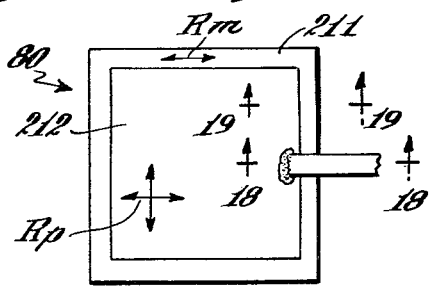
FIG. 17 is a schematic top elevation of a diaphragm according to the invention showing the application of the conductive coating and the construction of a terminal strip.

The diaphragm 80 consists, in the herein discussed practical embodiment, of a thin microscopically rough sheet of plastic material, such as the polymers available under the trade names Saran and Pliofilm. This sheet is fastened to the framework in the manner to be described hereinbelow, and is coated on one side by brushing on a graphite suspension in a wetting agent, such as water with a detergent and a light oil; the suspension available under the trade designation Aquadag wherein is suspended colloidal graphite was found suitable for the purpose, when thinned-out to reduce the deposit per unit area, consistent with the final resistance desired. As indicated in FIG. 17, the graphite suspension 212 is brushed only over the central section of the diaphragm, omitting a margin 211 about one-quarter to one-eighth of an inch wide. In a successful embodiment, the Saran or Pliofilm diaphragm is about six to eight microns thick and the coating approximately one-tenth of a micron.

A structure of this type provides a high effective lateral plate resistance, and an extremely high marginal resistance as indicated in FIG. 17 where $Rk$ is the lateral plate resistances and $Rm$ the marginal resistance. The electrostatic force should be proportional to the field gradient and the charge on the diaphragm, and the charge per unit surface of the diaphragm must be constant. This can be obtained by feeding the diaphragm through a large resistance R (FIG. 1) for example of the order of 600 megohms and by keeping the charge per unit area constant by way of selecting a conductive coating for the diaphragm which imparts to it a high lateral resistance.

The conductive coating is not carried out to the diaphragm frame in order to permit the maintenance of a large bias, which provision serves the same purpose as the above described shields for the strips of the screen electrodes.

The diaphragm is mounted so that any shrinking tendency or creep will be absorbed by a compliant mounting so that the diaphragm resonance will be relatively stable with respect to temperature and aging. The mounting which will now be described with reference to FIGS. 7 to 10 provides damping and thereby prevents edge reflection with the attendant phenomenon of standing waves, in addition to the above mentioned advantages of preventing shrinking and creeping.

In FIGS. 7 and 8, 211 is the diaphragm membrane proper and 212 is the brushed on conductive coating, as described above. The diaphragm is stretched by initially cementing it to a rhomboid ring 81 running peripherally around the entire framework as indicated in FIGS. 1 and 3. FIG. 7 indicates the ring cushion, which is for example made of foam Neoprene, in relaxed rhomboid shape 81.1. After stretching the diaphragm while cementing it to the foam rubber ring, the latter assumes the approximately rectangular shape 81 as shown in FIG. 8. The cement is shown at 215 and it will be evident that the finally protruding edge of the diaphragm, on the right-hand side of ring 81, will be trimmed off.

A single compliant diaphragm cushioning ring is often sufficient as indicated in FIG. 7, but two such rings are preferably used as indicated in FIGS. 1, 3 and 8. These rings have a decided damping action and no own resonant frequency. FIG. 9 is the equivalent mechanical impedance diagram of the diagram suspension, with acoustical impedances X, C and S indicated by a lever, by springs, and by a mechanical resistance respectively. This arrangement should comply with the following conditions.

As indicated in FIG. 3, the cushions 81, 82 are preferably secured in grooves 86, 87 of the frames 51, 52 which are lined with insulating strips 88, 89, respectively, that extend beyond the edge bridges of the screens 61, 62, partly covering the adjacent slats. This construction materially diminishes any possibility of insulation breakdown at this region.

FIG. 10 shows an alternative construction. The diaphragm 80 carries foam vibration dampers of comparatively narrow width indicated at 81.5 and 82.5, and is attached to a strap 221 which is connected to a spring 222 fixed to a frame member such as 52. This arrangement combines a rather slight damping by 81.5, 82.5 with a more active spring suspension at 222.

Recapitulation of the Principles of the Invention, Modified Components, and Operation It will now be evident that the principal characterizing features of the invention are an acoustically very favorable and yet mechanically stiff stationary electrode which is especially designed with a view to electrical potential distribution between fixed and movable electrodes, a diaphragm support construction which complement the fixed electrode construction, and a supporting framework which provides for optimal compactness, simplicity and certainty of auxiliary detail construction such as provisions for the joining of speaker units, for the mounting of units on supporting structures, and efficient and safe electrical connections to the fixed and moving electrodes. Further refinements and modifications of these principal components will now be described.

As mentioned above, it is especially convenient to use as the metallic element of the fixed electrodes the commercially available shading window screens. The standard inclination of the slats of screens of this type is approximately 25° to a line normal to the screen plane as a whole and this is generally speaking satisfactory for present purposes. However it is fairly easy to modify the production machinery for this type of screens such as to vary the dimensions and configurations to conform to all requirements for the present purpose of constructing electrostatic speakers.

Figures 12, 13:
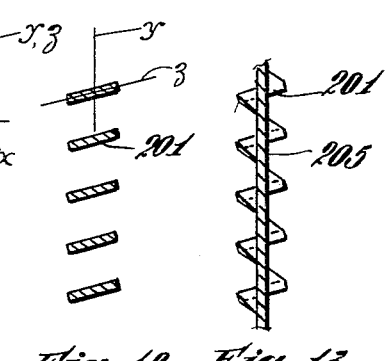
FIG. 12 is a section on lines 12—12 of FIG. 11.
FIG. 13 is a section on lines 13—13 of FIG. 11.

FIGS. 11 to 13 show screens of this type in detail and it will be evident that the strips or slats 201 conform to the construction as described above with reference to FIGS. 4 to 6. The bridges 205 have the function of properly spacing and defining the inclination of the slats 201 and they also serve for stiffening the unit as a whole by cooperation with the above described protruding components 75 of the grating elements 74 or for contacting the mounting rods to be described hereinbelow in connection with another embodiment of the invention.

FIG. 14 illustrates a modification of the construction according to FIGS. 11 to 13. In this case the slats 211 are continuous throughout the entire speaker unit, but connected by means of metal wires 215 taking the function of the bridges 205 of FIGS. 11 to 13. These wires are interwoven with the slats and fastened thereto by galvanizing the joints. The wires can be of any suitable material such as hard brass whereas the slats could be of the same material or of stainless steel.

Figure 16:
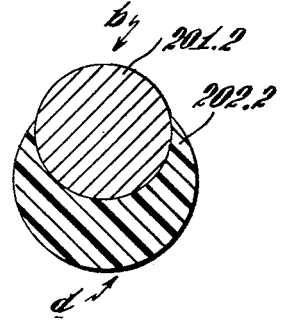

The electrical function of the insulating sheathing 202 and of the coating 203, also described above with reference to FIGS. 4 to 6, is not necessarily confined to the specific construction shown in these figures, but can be modified in various ways so long as the intended function is preserved; FIGS. 15 and 16 indicate this principle as follows. In FIG. 15 the slats 201.1 are elongate and the sheathing 202.1 although here covering the entire slat is much thicker at the end which faces the diaphragm, as indicated at *d*. Thicker sheathing heads of this kind can be obtained by dipping the slats in a rather viscous phase of a polymer and by allowing the thicker side to be formed by gravitational displacement. The modification according to FIG. 16 uses a round or otherwise bi-symmetrical metal electrode element 201.2, but a heavily unsymmetrical dielectric sheathing 202.2, facing the movable diaphragm as again indicated at *d*.

The advantage of the unsymmetrical dielectric covering of the screen slats and of the spacing of screen elements and screen units has been explained above with reference to the dimensions "*t*" and "*s*," and it will be remembered that, by properly selecting these dimensions, successful operation is even possible with bare screens, although in most cases shielding dielectrics as above described will be used to advantage. It will now be evident that in the case of conventional symmetrical coverings the first breakdown will occur towards the diaphragm and carbonize a channel through the dielectric which from then on will maintain the breakdown voltage practically at a constant value that is much lower than the initial design value. On the other hand if the first breakdown is forced to occur, in accordance with the invention from the back (indicated at *d* of FIGS. 15 and 16), the breakdown is controlled in the sense that it will always occur in such a way that it will not affect or injure the dielectric so that after each breakdown the original condition of the dielectric still prevails, that is the high original design breakdown value is maintained. Also, the distance from the diaphragm to the back of the slat where the controllable breakdown starts is much larger than in conventional constructions. For a potential difference of from two to five kilovolts over a distance of a quarter inch from screen to screen across the diaphragm, this results in a peak voltage screen to diaphragm voltage of about 25 kv. per inch under normal operation, as compared to 50 kv. per inch in existing systems of more or less similar types. Referring to the above mentioned use of commercially available shading window screens for present purposes, it should be mentioned that standard screens of this type are perfectly satisfactory for present purposes for frequencies from 200 to 8000 cycles per second. For a more extended range slightly modified configurations are preferable, designed especially for each purpose depending on specifications such as the mounting and the size of the units. In each case there is an optimum relation between the width of the slats and the distance therebetween.

As a further advantage it was found that the problem of excluding destructive interference between front and back radiation of opposing phase is largely absent from speakers of the present type which have a sharply 8-shaped radiation distribution so that little energy goes around the margin of the speaker unit. There is the further possibility of mounting the speaker units at a slant to a ceiling which results in reflection into a harmless direction of the back radiation.

Figures 18, 19:
FIG. 18 is a section on lines 18—18 of FIG. 17.
FIG. 19 is a section on lines 19—19 of FIG. 17.

With regard to the diaphragm component, it was mentioned above that, referring now to FIGS. 18 to 20, a microscopically rough polymer sheet 211 is coated with a conductive coating 212 by omitting the marginal parts. FIG. 19 shows the construction of an electric connection such as shown at 91 of FIGS. 3 and 19, leading to the conductor within the channel 55 of the framework.

Coming now to the electrical and mechanical operation of speakers constructed in accordance with the present invention, it was found that the following conditions can be easily maintained by virtue of this construction. Referring to FIG. 1, the bias voltage is from between 2 and 5 kilovolts for a screen to screen distance of about one-quarter of an inch. The resistance in the biasing circuit is preferably 200 to 600 megohms. The feeding strip resistance is about 5 to 20 megohms, and the impedance looking into the diaphragm is in the order of or larger than 200,000 to 400,000 megohms. The capacitance C between the screen electrodes is $C_s/2$ where $C_s = \int_s C_6 dA$. $C_s$, the total capacity between electrodes and a centered diaphragm is about 0.0032 $\mu$fd. The charging time constant is of second order magnitude, smaller than ½ $R_0 C_{ab}$, wherein $R_0$ is the charging resistance, and $C_{ab}$ is $2 \times C_s$. The load voltage is approximately 300 volts and the peak to peak voltage between 1800 and 2000 volts for a very loud output. The diaphragm resonance frequency with the bias voltage on the speaker is about 10 to 12 c.p.s. in free air. The discharge time constant is about 15 hours. For a wide range speaker designed for fairly undistorted output from 20 to 20,000 c.p.s. the limit of diaphragm excursion for low frequency and high amplitude signals is below .06 inch due to Doppler effect distortion of higher frequencies, therefore screens have preferably a spacing between screen and diaphragm of 0.2 inch, with a modular size of 16" x 32" or 16" x 16".

Speakers of the present type can be used in composite assemblies of the type to be discussed hereinbelow adding up to diaphragm areas of 10 square feet or more, and they can also be used in small resonators for single diaphragm units, such resonators having preferably a resonance well below the limit of hearing, that is approximately 20 c.p.s.

Embodiment With Curved Speaker Unit

Referring now to FIGS. 21 to 24 the above mentioned embodiment which provides for stiffening of the speaker unit by means of curving will now be described with reference to FIGS. 21 to 26.

In this embodiment the frame has two side pieces each consisting of a base 301 and a top strip 302 which together constitute the side support 300 as clearly shown in FIG. 21. At the narrower sides of the unit the side supports are joined by the assembly 303 shown in FIG. 22 as follows. A bottom plate 305 and a top plate 306 extend between the two side pieces 301, 302, these two plates securing therebetween the speaker components proper as follows.

Next to the bottom and top plates 305 and 306 respectively are arranged the screens 61 and 62 similar to those shown in FIGS. 1 to 3 and 11 to 13. Next come two spacers 307 and 308, which are also shown in FIG. 24. By means of screws 311, 312, 313 this end construction 303 is clamped together confining the screens 61 and 62 between top plate 306 and distancer 308, and bottom plate 305 and distancer 307 respectively. The slat screens are flattened at their narrower ends for that purpose. In order to provide proper distancing between the electrodes, and for stiffening the structure as a whole, distancing rods 321, 322 (FIGS. 23, 25) are inserted between the diaphragm 80 and the respective screens 61 and 62, such that the rods rest at the bridges 205 of the screens as indicated in FIG. 27. These rods reach into the sponge rubber diaphragm supports 81 and 82 which correspond to those described with reference to FIGS. 1 to 3, 7 and 8. Spacers 309 extending on each longer side of the unit correspond to the spacers 308 and 307 of the shorter sides, as indicated in FIG. 23. The distancing and stiffening rods are preferably made from firm and well insulating plastic material such as Lucite.

As indicated in FIGS. 24 and 25, the diaphragm is supplied with the signal input by means of foil strips 331 which are connected to the conductive portion 212 of the diaphragm 80 by means of silver paint, silver cement, or similar means, indicated at 332. In order to prevent sparking over to the screen, an insulating shield 335 is applied to the slat screen (FIG. 24), and this reinforcement permits the increase of the bias voltage from 2000 to 3500 volts. FIG. 24 also indicates the insulating strips 88 described with reference to FIG. 3. The stiffening rods 321, 322 are at the points 205 cemented as at 323 to the screens as well as to the diaphragm, as indicated in FIG. 27.

As illustrated in FIG. 26, the curved rods 322 may take the shape of extruded wing profiles 341, 342 which contribute essentially to the transverse stiffness of the speaker unit. The wings also contribute essentially as barriers against leakage.

A further reinforcement is indicated in FIGS. 26 and 27. In FIGS. 26, the insulation strips 345 which are applied to the diaphragm at the contact points with the rods, serve as reinforcement to prevent high physical stress concentrations at the points of suspension, especially also during transport. In FIG. 27, similar strips 345.1 serve mainly as a dielectric to prevent breakdown along the surface of the supporting rods. In both instances these strips increase the leakage path, as indicated by the dotted line $p$ in FIG. 26. The strips can be made of commercially available Scotch #22 or #33 tape.

For units of considerable dimensions it was found preferable to make the back rod 322, if the speaker unit curved cylindrically about an axis lying behind the speaker, of somewhat larger diameter than the front rod 322, in order to provide space for any sagging the diaphragm might undergo.

It will be evident that any number of spacing rods such as 321, 322 can be used, as indicated by the break in FIG. 23.

The above described curved screen supporting structure needs very little space due to the self-supporting curved construction so that very low parasitic capacitance and hence greater efficiency are provided. Speaker structures of this type have to be charged with a considerable $q$ and it is well known that reduction of this $q$ which has to be constantly moved is rather essential. The present construction, it was found, reduces the $q$ to an unexpected degree, so that this dragging of the charge is largely avoided.

Speaker Mounting

As described with reference to FIG. 2, the speaker frames can be provided with notches 101, 102 for appropriately mounting these units individually. Very powerful speaker installations can be easily provided by means of the construction illustrated in FIGS. 28 to 31 which will now be described. As shown in FIG. 28, mounting brackets 401 can be screwed or otherwise fastened to a wall or ceiling W. These brackets have a mounting flange 402, a speaker frame flange 403, and longitudinal perforations 405 of lengths which diminish towards the flange 402 as clearly indicated in FIG. 29. Clips 411, compare FIG. 31, have tapering and slightly curved lips 412 and rectangular flanges 416, the tapering and curvature being so calculated that the insertion of the tapered lip 412 in a narrower opening 405 compensates for the increased length of the unit plus mounting clips, as will be evident from FIGS. 28 and 30.

For mounting a plurality of speaker units by means of this arrangement, the brackets 401, two between each pair of speakers and at each end, are screwed to the wall or ceiling, the clips 411 are inserted into the slits 101, 102 (FIG. 2) of the speaker frame, and then into appropriate slots 405. On the other side the speaker slots are inserted into the upper bracket flanges 403, or clips 411 can be used on both sides of the speaker unit in which case the flanges 403 can be omitted.

The space between the brackets 401, the wall W and the speaker unit themselves can be filled with material such as fiberglas, indicated at 421 of FIG. 27. A grill cloth 422 can be fastened to the mounting strip 423, and outer brackets of such an assembly can be concealed by means of edge strip boards 425 appropriately secured to the molding 423 and the wall strip 424.

The axes of high frequency propagation are indicated at $a$ of FIG. 27 which also indicates the approximate propagation pattern $e$ which, as mentioned above is of narrow 8 shaped configuration.

FIG. 32 illustrates one of the possibilities of utilizing speakers according to this invention for effects which it was heretofore impossible to achieve, or to achieve with comparatively simple means.

In FIG. 32, numeral 501 denotes a woofer speaker built up from several modular units constructed according to FIGS. 1 to 3; three modules 501.1, 501.2 and 501.3 are indicated. These can be mounted in the manner described above with reference to FIGS. 28 to 31, or in any other convenient way. A tweeter speaker is indicated at 502, and this is preferably constructed as described with reference to FIGS. 21 to 27; it is comparatively low as compared to its width, as indicated in FIG. 32.

This combination of a large, generally speaking flat, woofer with a narrow curved tweeter is superior to conventional designs with a flat tweeter within a woofer for the following reasons. It is known that the high frequencies produced by an orchestra sound as if coming from an approximately centrally located point which will in most instances more or less coincide with the position of a soloist. In the arrangement according to FIG. 3, the high frequency components of the acoustical spectrum seem to come approximately from the center of curvature H of the tweeter, whereas the mid frequency components seem to come from more or less the entire width of the tweeter; the image of the orchestra appears to be across the full width of this speaker since its psychoacoustical placement depends more upon the mid and low frequency portions of the spectrum it is emitting. Thus a realistically favorable reproduction of actual conditions is achieved, due to the possibility provided by this invention, of making curved electrostatic speakers.

Electrical Equipment

While the supply system for speakers according to the present invention can be basically conventional as indicated in FIG. 1, more elaborate circuitry lends itself particularly for use with speaker units according to the invention, and for purposes of the invention in combination with such speaker units.

The circuitry of two typical embodiments of such electrical signal transfer systems is shown in FIGS. 33 to 36. FIG. 33 is concerned with a stereophonic system with speaker units for low and high frequency output, FIG. 34 illustrates a feedback circuit, and FIGS. 35 and 36 are concerned with modifications which are in some instances particularly favorable within the general scheme of the invention.

In FIG. 33, the four speakers of a stereophonic system are indicated at WL, WR, TL and TR, these legends signifying left and right-hand woofers and tweeters respectively. The common bias voltage supply terminals are indicated at $bv1$, $bv2$ and the left and right-hand signal supply terminals at $ls$ and $rs$, respectively. These signal input terminals are connected to amplifying means, as will be discussed hereinbelow. $Nl$ and $Nr$ indicate conventional cross-over networks with low frequency bypass inductors L1, L2 and resistors $r1$, $r2$. Each one of the transformers 117.6, 117.7, 117.8, 117.9 corresponds to the transformer group designated 117.1, 117.2 in FIG. 1. The midpoints of the secondaries of these transformers are connected to the bias voltage terminal $bv1$. The other bias voltage terminal $bv2$ is connected, through diaphragm resistors $r5$, $r7$, $r9$ and $r4$, $r6$, $r8$ to the diaphragms of the respective speakers. These resistors correspond to resistor R of FIG. 1. The end terminals of transformers 117.6, 117.8, 117.7, 117.9 are connected to rigid electrodes. The compliant (diaphragm) and rigid (screen) electrodes are indicated for speaker WL at 80, 61, 62, in correspondence to the respective numerals of FIG. 1. Bias shunt resistors are indicated at $r11$ and $r12$.

The operation of systems of this type will be understood by those skilled in this art, especially with reference to the preceding explanations of FIGS. 1 to 19.

FIG. 34 illustrates a device for introducing corrective feedback into electrostatic speakers according to the invention. In this figure, screens 61, 62 and diaphragm 80 again represent a speaker, or a speaker system according to the invention. The audio signal input is indicated at 211, an amplifier at 215, and a transformer at 217. Bias voltage is supplied at 218, and a bias resistor is indicated at R. Capacitors $c1$ and $c2$ are connected between the bias conductor 220, and the leads 221, 222 from the transformer secondaries to the screen electrodes. The function of these capacitors will be explained hereinbelow. The following circuit elements are inserted into the electrode supply conductors.

The screen electrode leads 221, 222 contain the secondaries of oscillator transformers 231, 232 respectively, which are connected to RF signal generators, such as conventional oscillators 233 and 234. These oscillators are designed to deliver two frequencies $Fe1$ and $Fe2$ which should be sufficiently distinct so as not to heterodyne in the audio range. Values of $Fc1=150$ kc. and $fc2=100$ kc. were found to be satisfactory.

The diaphragm lead 220 contains the secondary of a feed-back transformer 231 which is connected to a frequency separating circuit 240 which has two resonant components 241, 242 which are tuned to the frequencies $fc1$, $fc2$, respectively, two rectifiers $q201$, $q202$ and two filter circuits 251, 252. It should be noted that the circuit 240 is not a conventional discriminator circuit but that the two resonance frequencies $fc1$, $fc2$ are widely separated such as to avoid audio heterodyning, as mentioned above. The components of the tuned and filter circuits are indicated at $r201$, $r202$; $c201$, $c203$, $c202$, $c204$; $q201$, $q202$. It should be kept in mind that the time constant of capacitors $c202$ and $c204$ should be above the operating audio range frequency. Capacitors $c206$, $c207$ are RD bypass devices, with impedances small at radio frequencies and large at audio frequencies. A conventional amplifier 250 receives the signal from the circuit 240 and feeds it into a conventional phase equalizer 251 which in turn applies a negative feedback signal through conductor 252 to the audio input channel 211.

The arrangement according to FIG. 34 operates as follows.

The oscillators 233, 234 impose on the screens 61, 62 signals of radio frequencies $fc1$ and $fc2$ respectively, these signals being out of phase just as the excursions of diaphragm 80 relatively to screens 61, 62 respectively, are out of phase. The RF signal of one frequency say $fc1$, on the screen 61 is read in one sense by the diaphragm when it swings towards that screen, while the other RF signal $fc2$ is read in the other sense when the diaphragm swings towards the other screen 62. Thus, the RF signals from the oscillators are modulated proportionate to the diaphragm excursions, an amount of RF signal from the oscillators being introduced that cancels out the diaphragm signal when it is in one phase, and reinforces the diaphragm signal when it is in opposite phase. The resulting amplitude modulated signal is filtered to eliminate all frequencies but $fc1$ and $fc2$ at 241, 242 canceling and reinforcing components of the respective frequencies $fc1$ and $fc2$, detected at $q201$, $q202$, and fed to the input of the amplifier 250. The phases are equalized at 251 and the audio signal is fed through 252 into the speaker amplifier 215 as a corrective feedback signal.

It will now be evident that the above described feedback arrangement reduces the overall distortion in the system due to non-linear ties in suspension, amplification and air loading.

FIG. 35 illustrates a modification of the above-described circuits which is of considerable advantage if a comparatively large number of standard modular speaker units is used in a single installation.

When an appreciable number of speaker units according to the invention is connected in parallel for example by means of the plug-in provisions described with reference to FIG. 2, the overall connector and lead-in resistance decreases and the common bias resistor such as R of FIG. 1 has to be adjusted accordingly, and readjusted if a module is added or removed. Also, the individual connections in parallel introduce uncontrollable variations between the individual effective bias resistances.

In accordance with this aspect of the invention, each module is provided with an individual bias resistor such that the major portion of the bias resistance is constituted by these individual resistors which are located within respective modular speaker components.

In FIG. 35, an input component such as shown in FIG. 34, with transformer 317, bias input 318, common bias resistor R3 and bypass capacitors $c306$, $c307$. A bus system is indicated at 310 into which can be plugged any desired number of modular speakers 311, 312, etc., for example by means of receptacles 95 and prongs 96 such as shown in FIG. 2. Each module 311, 312, etc. has an individual bias resistor 321, 322, etc.

It will be understood that additional bus systems can be connected to the input connectors, for example at 311. Characteristic values for the central and module bias resistors will be given hereinbelow.

Referring to FIGS. 1, 33, 34 and 36 it will be noted that three different ways of supplying the audio signal are indicated in respective figures. The use of two wholly independent amplifiers and transformers, as shown in FIG. 1, permits the isolation of a feedback signal, such as described with reference to FIG. 34, in each amplifier, making it easier to obtain satisfactory functioning of push-pull amplifiers without clipping on one side of the diaphragm.

Thus, the least elaborate signal input with a single amplifier and transformer such as shown with the feedback device of FIG. 34 is actually least desirable for that purpose if cost is no object, while a circuit exactly as shown in FIG. 34 can be fairly satisfactory for many purposes.

FIG. 36 illustrates an intermediate solution, wherein an amplifier 120 replaces the two amplifiers 115, 116 of FIG. 1. As indicated, the amplifier has two separate output stages feeding into separate transformers according to FIG. 1.

The arrangement according to FIG. 36 permits a greater degree of isolation between each side of a push-pull amplifier, that is the discrete amplifier stages after the inverter, one for each screen electrode relatively to a respective side of the diaphragm. With such separation of the amplifier sides the only coupling between the sides generally is through the capacitance of the speaker proper.

The nature and the electrical connections of the elements of the systems according to FIGS. 33 to 36, are clearly shown in these figures, whereas the structural or electrical characteristics or dimensions and ratings, so far as material for the proper operation of the devices, are identified in the following tabulations which refer to the numerals of the figures, it being understood that adjustments and mutual correlations have to be applied upon initial testing for proper performance, according to routine practice in the manufacture of devices of this type.

*Stereophonic System—FIG. 33*

Speakers:
  WL and WR:
    Speaker capacitance _____ μμf__ 0.3
    Screen to screen spacing _____ inches__ 0.45
    Area _____ square feet__ 7
  TL and TR:
    Capacitance _____ μμf__ 0.2
    Spacing _____ inches__ 0.125
    Area _____ square feet__ 1.0

*Stereophonic System—FIG. 33—Continued*

Electrical characteristics:
    Bias voltage at $bv1$, $bv2$ _____ kv__ 17
    Voltage on TL, TR _____ kv__ 4 to 8
    Voltage on WL, WR _____ kv__ 15 to 18
    Transformer ratios _____ 117.6, 117.7 ... 1::250
                        117.8, 117.9 ... 1::400
    Impedance looking into $ls$, $rs$ _____ ohms__ 8

Resistors:
    $r1$, $r2$ _____ ohms__ 2
    $r4$, $r5$, $r11$, $r12$ _____ megohms__ 50
    $r6$, $r7$ _____ K__ 4
    $r8$, $r9$ _____ megohms__ 500

Inductors:
    $L1$, $L2$ _____ 3M2

*Feedback System—FIG. 34*

Electrical characteristics:
    $fc1$, at 241 _____ kc__ 150
    $fc2$, at 242 _____ kc__ 100

Resistors:
    $r201$, $r202$ _____ K__ 47

Capacitors:
    $C202$, $C204$ _____ μμf__ 200

*Modular System—FIG. 35*

Resistors:
    $R3$ _____ megohms__ 5 to 15
    $r21$, $r22$ _____ do____ 2000

It should be understood that the present disclosure is for the purpose of illustration only and that this invention includes all modifications and equivalents which fall within the scope of the appended claims.

I claim:

1. In an electroacoustical transducer of the electrostatic type having rigid electrode means parallel to diaphragmatic electrode means, an electrode screen comprising: a plurality of similarly shaped elongate and strip-shaped conductor elements which are joined parallel to each other in a regular pattern by supporting and conductively connecting means such that the longer transverse axis of each conductor element is inclined at a small angle to the diaphragmatic electrode means.

2. An electrode screen according to claim 1 including further a coating on said conductor elements, at the sides adjacent to said diaphragmatic electrode means, of a material having higher surface resistance than the conductor elements, high dielectric strength and moderate volume resistance such as to comply with the relationships $$1/R_n + 1/R_{n+1} + 1/R_{n+2} + \ldots > R_m + R_{m+1} + R_{m+2} \ldots$$

and $$C_m + C_{m+1} + C_{m+2} + \ldots >>> C_n$$

with $$\sum_{C_{m+p}}^{C_m} C$$

being insufficient to store potential to feed a spark between the electrode means; wherein $R_n$ are surface resistances,
$R_m$ are volume resistances,
$C_m$ is the capacitance of the coating material,
And wherein $p$ goes to infinity as the increment volume goes to zero;

whereby a large potential can be maintained across $C_n$ whereas, whenever sufficient signal voltage is present to ionize the air between the electrode means, the voltage drop across the resistance of the coating material is sufficient to quench any sparking between the electrode means.

3. An essentially stiff and acoustically transparent stationary electrode for use in a position parallel to the moving diaphragm of an electrostatic loudspeaker, comprising: metallic rod elements in rows parallel to the diaphragm; and insulating shield means applied to respective ones of said rod elements, and being shaped such that its dielectric strength diminishes with the distance from the diaphragm of respective points of the rod elements to which the shield means are applied; whereby breakdown between stationary electrode and moving diaphragm can be confined to portions of the rod elements which face away from the diaphragm.

4. Electrode according to claim 3 wherein said shield means terminates adjacent rod element portions facing away from the diaphragm, said rod element portions being substantially bare, whereby breakdown paths within said shield means are avoided.

5. Electrode according to claim 3 wherein said rod elements comprise slats of rectangular cross sections with the longer sides of said cross sections facing each other, and wherein said shield means cover the shorter side of the cross sections which faces the diaphragm.

6. An essentially stiff and acoustically transparent stationary electrode for use in cooperation with the adjacent moving diaphragm of an electrostatic loudspeaker, comprising: metallic lattice elements of elongate cross sections arranged side by side parallel to the diaphragm with the longer dimension of said cross section obliquely to the general plane of the electrode; and an insulating shield applied to said lattice elements unsymmetrically with respect to the shorter dimension of said cross section such that the dielectric strength of the insulating coating diminishes with the distance from the diaphragm of respective points of the lattice element to which the insulating coating is applied; whereby breakdown between electrode and diaphragm can be confined to portions of the lattice elements which are on their open side turned away from the diaphragm.

7. An essentially stiff and acoustically transparent stationary electrode for use in cooperation with the adjacent moving diaphragm of an electrostatic loudspeaker, comprising: series of metallic rod elements arranged side by side parallel to the diaphragm; and insulating shielding means applied to each one of said rod elements; the distances between said rod elements being substantially smaller than the distances between respective rod elements and the diaphragm; whereby breakdown of the shielding means can be confined to regions which do not face the diaphragm.

8. An essentially stiff and acoustically transparent stationary electrode for use in cooperation with the adjacent moving diaphragm of an electrostatic loudspeaker, comprising: series of metallic slat elements with elongate cross section, the longer sides of the cross sections facing each other; and insulating shielding means applied to the shorter side of the cross sections which face the diaphragm and part of the longer sides of the cross sections; the distances between said rod elements being substantially smaller than the distances between respective rod elements and the diaphragm; whereby the potential gradient can be kept substantially constant between all points of the slat elements so that the shielding means will not become punctured but breakdown will occur between the unshielded back portions of the rod elements.

9. An electroacoustical transducer unit of the electrostatic type comprising: a conductive electrode diaphragm; two electrode screens arranged parallel to each other each including a plurality of similarly shaped conductive elongate slat elements and conductive bridges transverse of said elements, joining the elements parallel to each other in a regular pattern with the longer transverse axis of each slat element inclined to the diaphragm; and frame means for compliantly supporting said diaphragm between said two electrode screens; whereby comparatively large mechanically stiff electrode screens can be provided which are acoustically highly transparent and efficient.

10. Unit according to claim 9 further comprising grating means with intersecting bars of transversely elongate cross sections, one set of bars being parallel and having edges extending transversely beyond the other set, being spaced to register with said bridges, and being mounted with said edges in contact with said bridges, whereby the mechanical rigidity of the unit is increased.

11. Unit according to claim 9 further comprising a plurality of insulating rod members extending crosswise of said slat elements between said diaphragm and a pair of bridges on opposite screens respectively, whereby the mechanical rigidity of the unit is further increased.

12. Unit according to claim 11 wherein said rod members have diametrically opposite ridges extending between the diaphragm and respective screens, whereby said rod members are mechanically reinforced and the creep path between diaphragm and screens is increased.

13. Unit according to claim 11 further comprising insulating reinforcement strips inserted between said conductive coating of the diaphragm and said rod members.

14. Unit according to claim 9 wherein the distance of said slats from said diaphragm is greater than the distance of said slats from each other.

15. Unit according to claim 9, further comprising insulating shields covering those portions of said slat elements which face the diaphragm.

16. Unit according to claim 15 further comprising auxiliary insulating shields applied to the portions of the slats of one of said screens which are furthest removed from said diaphragm, whereby breakdown due to excessively high signal voltage can occur only between the diaphragm and the other of the two screens while detrimental breakdown between the two screens is avoided.

17. An electroacoustical transducer unit of the electrostatic type comprising: a compliant electrode diaphragm including a conductive layer, two electrode screens one on each side of said diaphragm, each including a plurality of metallic slats of elongate cross sections, said slats being mounted on either side of said diaphragm parallel thereto and with the longer axes of said cross sections intersecting the diaphragm plane; whereby said screens have optimal mechanical rigidity together with optimal acoustical transparency.

18. Unit according to claim 17 wherein said screens have bridges integral with and extending crosswise of said slats, whereby the mechanical rigidity is further increased.

19. Unit according to claim 17 further comprising insulating shields covering the portions of said slats which are adjacent to said diaphragm.

20. Unit according to claim 19 further comprising auxiliary insulating shields applied to the portions of the slats of one of said screens which are furthest removed from the diaphragm, whereby breakdown due to excessively high signal voltage can occur only between the diaphragm and the other of the two screens while detrimental breakdown between the two screens is avoided.

21. An electroacoustical transducer unit of the electrostatic type comprising: two electrode screens disposed parallel to each other each including a plurality of similarly shaped elongate and strip shaped conductor elements and conductive means for joining said conductor elements parallel to each other in a regular pattern such that the longer axis of each conductor element is inclined at a small angle to the plane of the respective electrode screen; an electrode diaphragm including a compliant sheet of insulating material and applied to one side of said sheet a resistive coating; and frame means for compliantly supporting said diaphragm between said two electrode screens; whereby phase distortion is eliminated due to the planar source of all frequencies, transient response is improved, high power handling capacity is provided, several transducer units with staggered diaphragm resonances can be joined, and low frequency response is promoted, due to the high coupling constant between diaphragm and the low mass and high compliance of the diaphragm and the high acoustical transparency of the screens.

22. Transducer unit according to claim 21, wherein said resistive coating is essentially restricted to the free portion of the compliant sheet, stopping short of the marginal portion which is fastened to said frame means.

23. Transducer unit according to claim 22 having an extension, of restricted width, of said conductive coating where it reaches towards said frame means in order to provide a feed terminal.

24. In an electroacoustic transducer of the electrostatic type having rigid electrode means closely adjacent to diaphragm electrode means adapted for application thereto of biasing potential, and for the connection of signal output means across the electrode means, an electrode diaphragm comprising: a compliant sheet of insulating material; applied to one side of said sheet, a conductive coating having a resistance sufficiently high to maintain constant the charge per unit area of the sheet for any displacement configuration thereof; and, over said conductive coating, a high resistance coating which counteracts the bleeding of charge from the conductive coating.

25. A diaphragm according to claim 24, wherein said conductive coating consists of a suspension of graphite and said high resistance coating consists of silicone grease.

References Cited in the file of this patent
UNITED STATES PATENTS

| | | |
|---|---|---|
| 1,674,683 | Hahnemann | June 26, 1928 |
| 1,767,657 | Edelman | June 24, 1930 |
| 1,782,278 | Vogt | Nov. 18, 1930 |
| 1,809,754 | Steedle | June 9, 1931 |
| 1,831,278 | Wolfe | Nov. 10, 1931 |
| 1,930,518 | High | Oct. 17, 1933 |
| 2,141,423 | Tolerton | Dec. 27, 1938 |
| 2,631,196 | Janszen | Mar. 10, 1953 |
| 2,678,967 | Grosskopf | May 18, 1954 |
| 2,860,183 | Conrad | Nov. 11, 1958 |
| 2,878,323 | Bobb | Mar. 17, 1959 |
| 2,896,025 | Janszen | July 21, 1959 |
| 2,922,851 | Manley | Jan. 26, 1960 |
| 2,975,243 | Katella et al. | Mar. 14, 1961 |
| 3,008,013 | Williamson et al. | Nov. 7, 1961 |
| 3,008,014 | Williamson et al. | Nov. 7, 1961 |

FOREIGN PATENTS

| | | |
|---|---|---|
| 372,649 | England | May 12, 1932 |
| 596,390 | Germany | May 2, 1934 |
| 70,574 | France | Dec. 22, 1958 |
| 815,978 | Great Britain | July 8, 1959 |